United States Patent
Shirono et al.

(10) Patent No.: US 6,994,834 B1
(45) Date of Patent: Feb. 7, 2006

(54) SURFACE-MODIFIED FINE SILICA POWDER AND USE THEREOF

(75) Inventors: Hirokuni Shirono, Yokkaichi (JP); Masamichi Murota, Yokkaichi (JP); Yuki Amano, Yokkaichi (JP)

(73) Assignee: Nippon Aerosil Co., Ltd., Tokyo (JP)

( * ) Notice: Subject to any disclaimer, the term of this patent is extended or adjusted under 35 U.S.C. 154(b) by 420 days.

(21) Appl. No.: 10/088,101

(22) PCT Filed: Sep. 22, 2000

(86) PCT No.: PCT/JP00/06507

§ 371 (c)(1),
(2), (4) Date: May 31, 2002

(87) PCT Pub. No.: WO01/21529

PCT Pub. Date: Mar. 29, 2001

(30) Foreign Application Priority Data

Sep. 22, 1999 (JP) .................................. 11-268565

(51) Int. Cl.
*C01B 33/18* (2006.01)
*B01J 20/10* (2006.01)
*B41M 5/00* (2006.01)
*D21H 19/40* (2006.01)

(52) U.S. Cl. ...................... 423/335; 423/336; 423/337; 428/32.34; 428/32.36; 428/32.37; 106/31.13

(58) Field of Classification Search ................ 423/335, 423/338, 339, 336, 337; 430/59; 428/32.34, 428/32.36, 32.37; 106/31.13, 31.25
See application file for complete search history.

(56) References Cited

U.S. PATENT DOCUMENTS 3,915,735 A * 10/1975 Moreland .................... 106/490
5,378,566 A * 1/1995 Yu ........................... 430/58.05
6,077,640 A 6/2000 Komai et al. ................ 430/110
6,225,014 B1 * 5/2001 Patterson et al. ............. 430/64

FOREIGN PATENT DOCUMENTS

| JP | 58-185405 | 10/1983 |
| JP | 60-224580 | 11/1985 |
| JP | 62-178384 | 8/1987 |

* cited by examiner

*Primary Examiner*—Ngoc-Yen Nguyen
(74) *Attorney, Agent, or Firm*—Oblon, Spivak, McClelland, Maier & Neustadt, P.C.

(57) ABSTRACT

A surface modified fine silica powder which has been treated, preferably, with a treating agent containing an amino group, characterized in that the powder exhibits an adsorption amount for an anion source compound of 150% or more of that of an original powder which has not been treated; and a printing material using the silica powder. The surface modified fine silica powder can provide an excellent printed matter being free from blotting with ink or a cracking of coating film.

10 Claims, No Drawings

SURFACE-MODIFIED FINE SILICA POWDER AND USE THEREOF

FIELD OF THE INVENTION

Present invention relates to a surface-modified fine silica powder suitable as a material of an ink acceptor layer having the excellent printing effect, and its forming liquid or a printing material. Concretely, the present invention relates to the surface-modified fine silica powder having the excellent printing effect by being the adsorption amount of an anion source compound as an index and making its amount to more than a constant level, and its application to the ink acceptor layer. Especially, the surface-modified fine silica powder of the present invention is suitable as various printing materials for an ink-jet printing.

DISCUSSION OF THE BACKGROUND

The ink acceptor layer has been coated on a surface of a recording paper used for printers of an electric instrument etc., in order to raise the printing effect, i.e. clear nature and fixing property etc. of ink. As a material of this ink acceptor layer, the materials having good fixing property without blotting with ink have been used, and the fine silica powder also has been used as one of said materials. However, when the fine silica powder is used for the ink-jet printer, which has been widely spread recently, the blotting with ink may occur on the surface of the recording paper at the time of printing, so that its improvement is acquired.

Although various surface-modified treatments has been conventionally known about the fine silica powder, it has been not known yet that the process, in which the printing effect is improved basing on the specific index about the surface-treatment. Therefore, when some surface-modified fine silica powders are used as the material of the ink acceptor layer, the printing effect cannot be improved sufficiently. Especially, in the printing materials used for ink-jet printing, sufficient effect may not be obtained.

Moreover, although the conventional fine silica powder has been used as a viscosity increasing reagent, when said fine silica powder is added to a coating material or printing ink etc., there are some problems in which the viscosity of slurry becomes high rapidly and the viscosity preparation becomes difficult when the much amount of fine silica powders is added.

OBJECT OF THE INVENTION

Present invention solves above-mentioned problems, and provides the surface-modified fine silica powder suitable as the material of the ink acceptor layer or the printing material etc. used for the ink-jet printing etc., by making the adsorption amount of the anion source compound as the index, and surface-treating until that said adsorption amount becomes more than the constant level. In addition, the present invention also provides the material of the ink acceptor layer or the printing material, which uses this surface-modified fine silica powder. Moreover, as a concrete example of the above-mentioned surface-modified fine silica powder, the present invention also provides the fine silica powder surface-treated with a specific silane compound containing an amino group. Furthermore, with above-mentioned properties, when the surface-modified fine silica powder of the present invention is used to make the silica slurry, the silica slurry, in which the viscosity is remarkably lower than that of using the conventional fine silica powder and the flowability is excellent, can be obtained.

DISCLOSURE OF THE INVENTION

The surface-modified fine silica powder of the present invention is surface-treated, until that the adsorption amount of the anion source compound becomes more than 150% of that of the untreated original powder. By doing such surface-treatment, when said fine silica powder of the present invention is used as the material of the ink acceptor layer, the excellent printing effect being free from blotting with ink can be obtained. As the surface-treatment reagent, the treatment reagent containing an amino group is used suitably. As the anion source compound, a sulfonate and a carboxylate can be used. These acid salts are combined easily with the amino group induced on the surface of the fine silica powder by the surface-treatment, so that said acid salts are suitable as the index being the surface-treatment degree. Regarding the surface-modified fine silica powder of the present invention, it is preferable that fumed-silica having the specific surface area of 50 to 400 $m^2/g$ by the BET method is used as the original powder. By using fumed-silica having this specific surface area, the surface-modified fine silica powder having high adsorption amount to the anion source compound, can be obtained.

The surface-modified fine silica powder of the present invention is surface-treated with the treatment reagent containing the amino group having a radical group, for example, an organosilane having a hydrolysis group or a silanol group with the amino group, in which said organosilane is shown in the general formula [1] of $R1_n \cdot R2SiY_{(3-n)}$ preferably. By using such treatment reagent containing the amino group, the hydrolysis condensation reaction between the fine silica powder and the surface-treatment reagent advances, so that the surface-modified fine silica powder having the amino group on the surface can be obtained suitably. Since this amino group is combined chemically with the silicon atom on the surface of silica, said amino group does not separate and change easily with the passage of time. In addition, by using more than two kinds of surface-treatment reagents containing the amino group, the amino group having different reactivity can be induced on the surface of the surface-modified fine silica powder. By inducing the amino group having different reactivity, the reactivity to the anion source compound becomes widely rather than the case of treating with the surface-treatment reagent containing one kind of the amino group, so that more kinds of the anion source compounds can be corresponded.

Moreover, the surface-modified fine silica powder of the present invention is surface-treated with the silane compound containing amino group, and the amino group having the amount of more than constant levels is induced on the surface of silica, so that the silica slurry having low viscosity also with high slurry concentration can be obtained.

That is, the present invention relates to the surface-modified fine silica powder comprising the following constitutions, and its application.

(1) A surface-modified fine silica powder for adsorbing the anion source compound, wherein the adsorption amount of the anion source compound to the surface-treated fine silica powder is more than 150% of that of the original powder before the surface-treatment.

(2) The surface-modified fine silica powder according to above-mentioned (1), wherein the anion source compound is the surfonate or the carboxylate, and its adsorption amount is more than 150% of that of the original powder before the surface-treatment.

(3) The surface-modified fine silica powder according to above-mentioned (1), wherein the anion source compound is sodium benzenesulfonate, and its adsorption amount is more than 15% of the additive amount to the fine silica powder.

(4) The surface-modified fine silica powder according to above-mentioned (1), wherein the nitrogen content is 0.3 to 1.0% and the adsorption amount of sodium benzenesulfonate is 15 to 60%, after the surface-treatment.

(5) The surface-modified fine silica powder according to any one of above-mentioned (1) to (4), wherein the adsorption amount of the anion source compound is made to more than 150% of that of the original powder before the surface-treatment by surface-treating with a treatment reagent containing amino group, which comprises the organic silicon compound having the hydrolysis group or the silanol group combined with the silicon atom, and more than one kind of amino group.

(6) The surface-modified fine silica powder according to above-mentioned (5), wherein the treatment reagent containing amino group is surface-treated with an organosilane shown in the general formula [1] of $(R1)_n \cdot (R2)SiY_{(3-n)}$, where R1 is a monovalence hydrocarbon group, R2 is a hydrocarbon group containing one or more amino groups, Y is a hydrolysis group or a hydroxyl group, and n is 0, 1, or 2.

(7) The surface-modified fine silica powder according to above-mentioned (6), wherein 100 g of the fine silica powder is surface-modified under dry-process using more than 10 mmol of one or more than two kinds of organosilane shown in the formula [1].

(8) The surface-modified fine silica powder according to any one of above-mentioned (1) to (7), wherein the original fine silica powder is fumed-silica having the specific surface area of 50 to 400 $m^2/g$ by the BET method.

(9) The surface-modified fine silica powder according to any one of above-mentioned (1) to (8), wherein said fine silica powder is hydrophilic, and is used as the material of the ink acceptor layer of the printing material.

(10) A low viscosity silica slurry comprising the fine silica powder according to above-mentioned (1), wherein the adsorption amount of the anion source compound is more than 150% of that of the original silica powder before the surface-treatment, the specific surface area is 200 to 400 $m^2/g$ by the BET method, nitrogen content is 0.3 to 1.3%, and the viscosity is 1 to 50 mPa·s, under pH of 3 to 6 and the silica concentration is 15 to 30%.

(11) A forming material of the ink acceptor layer containing 5 to 30% of the surface-modified fine silica powder according to any one of above-mentioned (1) to (10).

(12) An ink-jet printing material coated with the liquid comprising the forming material of the ink acceptor layer according to above-mentioned (ii).

BEST EMBODIMENT OF THE INVENTION

Hereafter, the present invention is explained concretely with the embodiments. In addition, % is weight % unless it is shown especially.

The surface-modified fine silica powder of the present invention is that the adsorption amount of the anion source compound to the surface-treated fine silica powder is more than 150% of that of original silica powder before the surface-treatment. The anion source compound means the compound that has the anion group combined with the amino group induced on the surface of the fine silica powder, for example, the sulfonate or the carboxylate etc. Concretely, as the sulfonate, toluenesulfonate, benzenesulfonate, and naphthalenesulfonate, such as sodium p-toluenesulfonate, sodium benzenesulfonate, sodium 1-naphthalenesulfonate, sodium 2-naphthalenesulfonate, and 2 sodium 2,6-naphthalenesulfonate, can be used. As the carboxylate, benzoate and naphthalenecarboxylate, such as sodiumu benzoate, sodium p-methylbenzoate, sodium 1-naphthalenecarboxylate, sodium 2-naphthalenecarboxylate, can be used.

The surface-modified fine silica powder of the present invention shows the surface-modified degree by making the adsorption amount of the anion source compound as the index. Moreover, said fine silica powder has higher adsorption amount of the anion source compound than the untreated original powder. Specifically, the adsorption amount of the anion source compound is more than 150% of that of the original powder before the surface-treatment. Since the surface-modified fine silica powder of the present invention has such high adsorption ability, when said fine silica powder is mixed in the ink acceptor layer etc., the blotting with ink can be prevented effectively. In addition, when this adsorption amount is less than 150%, the surface-treatment degree is not enough, and the blotting with ink etc. can not be prevented sufficiently.

As the example of the adsorption amount of the anion source compound, the adsorption amount of sodium benzenesulfonate is mentioned. The example of the surface-modified fine silica powder of the present invention is that the adsorption amount of sodium benzenesulfonate is more than 15% of the additive amount to the fine silica powder having basic amount. That is, as the concrete example, the fine silica powder is mentioned, in which said fine silica powder can adsorb more than 15% of sodium benzenesulfonate, when 100 ml of sodium benzenesulfonate aqueous solution having 2.5 mmol/g is added to 2 g of the surface-treated fine silica powder. Regarding said fine silica powder, the adsorption amount after the surface-treatment is about more than 150% of that of the original powder before the surface-treatment in general. Regarding the fine silica powder being the adsorption amount of sodium benzenesulfonate of less than 15%, the blotting with ink can not be prevented sufficiently, when it is mixed in the ink acceptor layer.

In addition, the adsorption amount of the anion source compound can be determined, by measuring the amounts of the anion source compounds in the aqueous solutions before and after. Concretely, for example, the adsorption amount of the anion source compound to the fine silica powder can be determined by the way that the fine silica powder having constant amount is added to the anion source compound aqueous solution to be dispersed with stirring, and the fine silica powder is removed after the fixed time. Then, the concentrations of the anion source compounds contained in the aqueous solutions before adding the fine silica powder and after removing the fine silica powder, are measured by a spectrophotometer etc., to determine the adsorption amount of the anion source compound by this concentration difference.

The surface-modified fine silica powder of the present invention has the specific surface area of more than 50 m²/g by the BET method, preferably more than 200 m²/g, more preferably 250 m²/g. When this specific surface area is less than 50 m²/g, the induced amount of the amino group per unit surface area is limited at the time of surface-treating, so that the fine silica powder cannot have high adsorption ability to the anion source compound. Moreover, the fine silica powder by the vapor phase method having the specific surface area of more than 400 m²/g, is not commercially produced now. When this specific surface area is too large, the induced amount of the amino group is restricted naturally. Therefore, it is suitable that the particle size of silica has the specific surface area of 50 to 400 m²/g by the BET method.

Moreover, it is preferable that the surface-modified fine silica powder is the fine powder made by the vapor phase method, i.e., fumed-silica. Since the silica powder obtained by wet-process has the large agglomerated particles, it is difficult to modify uniformly with the amino-silane on the surface of particle. Therefore, the adsorption amount to the anion source compound becomes low. Moreover, since a transparent feeling does not come out when the ink acceptor layer is formed, it is not desirable. As the example of the production by the vapor phase method, the flame hydrolysis method using tetrachlorosilane as a raw material is known. As the silica powder made by the vapor phase method, for example, the products made by NIPPON AEROSIL Co., Ltd. (Tradenames are Aerosil 1200, Aerosil 1200CF, Aerosil 1300, Aerosil 1300CF, Aerosil 380, and Aerosil 380S), the product made by Cabot Co. (Tradename is Cabosil), the product made by Wacker Co. (Tradename is HDK), the product made by Tokuyama Co. (Tradename is Reorosil), etc., are used.

The fine silica powder made by the vapor phase method has the hydroxyl group on the surface, and although said fine silica powder has the adsorption ability to the anion, its amount is low. The adsorption amount of the anion source compound is about several % to several 10% in the case of the untreated fine silica powder. Therefore, the fine silica powder of the present invention is surface-treated, with the treatment reagent containing the amino group preferably, until the level showing that the adsorption amount is more than 150% of that of the untreated original powder.

As mentioned above, the surface-modified fine silica powder is surface-treated with the treatment reagent containing the amino group preferably, and its nitrogen content is more than 0.3%. When the nitrogen content is less than 0.3%, the adsorption ability to sodium benzenesulfonate is low, and the adsorption amount of more than 15% can not be obtained. In addition, regarding the amount of the amino group induced on the surface of silica by the surface-modified treatment, about 1% of nitrogen content is a limit from various conditions, and at this time, the adsorption amount of sodium benzenesulfonate is about 60%.

It is available that the amino group induced on the surface of the fine silica powder has any one or more kinds of the 1st class amine, the 2nd class amine, the 3rd class amine, or the 4th class ammonium salt. As such treatment reagent containing the amino group, an organic silicon compound is preferable, in which said silicon compound has at least one of the hydrolysis group or the silanol group connected directly with silicon atom in 1 molecule, and at least one of the hydrocarbon group having more than one of the amino group connected with silicon atom by carbon-silicon bond. By using such organic silicon compound, these hydrolysis and silanol groups occur the condensation reaction with the silanol group on the surface of the fine silica powder by the hydrolysis etc., so that its formed compound is fixed chemically on the surface of fine silica powder. That is, the fine silica powder having the amino group on the surface can be obtained, by fixing the organic silicon compound having the amino group on the surface of the fine silica powder, and the anion compound can be adsorbed on the surface of silica by the cation property of the amino group.

As such organic silicon compound, for example, the organosilane shown in the following general formula [1] is suitable.

$$R1_n \cdot R2SiY_{(3-n)} \qquad [1]$$

where, R1 is a monovalence hydrocarbon group, R2 is a hydrocarbon group having more than one of the amino group, Y is a hydrolysis group or a hydroxyl group, n is 0, 1, or 2.

This hydrolysis group (Y) etc. is connected with the silanol group etc. on the surface of fine silica powder to induce the amino group (R) on the surface of silica. Moreover, the hydrocarbon group (R1) etc. is connected with other hydrolysis group etc. to have high adsorption strength to the surface of silica.

As this organic silicon compound, for example, γ-aminopropyltrimethoxy silane, γ-aminopropyltriethoxy silane, γ-(2-amino ethyl) aminopropyltrimethoxy silane, γ-(2-amino ethyl) aminopropyltriethoxy silane, N-phenyl-γ-aminopropyltrimethoxy silane, N-phenyl-γ-aminopropyltriethoxy silane, or octadecyldimethyl(3-(trimethoxysilil)propyl) ammoniumchloride, etc., can be used concretely. It is available that one or more than two kinds of these reagents can be used. By using more than two kinds of these reagents, the amino group having different reactivity can be induced on the surface. By inducing the amino group having different reactivity, the width of reactivity spreads rather than the case of surface-treating with one kind of the treatment reagent containing the amino group, and can correspond to more kinds of the anion source compound.

It is suitable that the using amount of the surface treatment reagent is more than 10 mmol (10 mmol/100 g), preferably more than 30 mmol (30 mmol/g), to 100 g of the fine silica powder. When the using amount of the treatment reagent is less than this amount, the surface-treatment effect is not obtained sufficiently. In addition, the number of silanol, which reacts with the amino group in the silane compound containing the amino group, is almost constant per unit area on the surface of silica, and the amount of the induced amino group is limited for the three-dimensional obstruction of the coated alkyl group. Incidentally, the amount of nitrogen after the surface treatment is about 1% in general, even when the specific surface area of silica is large.

It is preferable that the surface-treatment is done by the dry-process. Conventionally, the wet-process is known in general, in which the silica is surface-treated in water by dropping amino silane to disperse (Journal of the Japan Society of Colour Material, Vol. 55, No. 9, P 630–636, 1986). However, by this wet-process, in the case of the silica made by the vapor phase method, since the viscosity increasing is very high, the silica cannot be dispersed in water with high concentration. Therefore, the surface-treatment may not be done uniformly. Moreover, in the wet-process, it is necessary to dry after the surface-treatment, so that the treatment process becomes complicated. Furthermore, at the time of drying, the agglomeration occurs easily between the silica particles by the capillary tube pressure, and pulverizing is necessary, so that it is not economical. In addition, in the treatment process using hydrophobic reagent, which is also the dry-process, the surface-treated silica is hydrophobic, and cannot be dispersed in water, so that this process is not suitable to the ink acceptor layer comprising the material like water. And said dry-process is preferably done under heating and vigorous stirring in nitrogen atmosphere.

Since the surface-modified fine silica powder is connected with the amino group on the surface, said fine silica powder having the specific surface area of 200 to 400 m$^2$/g by the BET method contains about 0.3 to 1.0% of nitrogen, and becomes the low viscosity slurry when it is used as the water slurry. For example, under pH of 3 to 6 and 15 to 30% of the silica concentration, the silica slurry has high flowability, in which the viscosity is less than 50 mPa·s, preferably 1 to 50 mPa·s. In addition, when the nitrogen content is less than 0.3%, the viscosity of the silica slurry in the standard range becomes more than 50 mPa·s, so that the flowability decreases.

In the hydrophilic surface-modified fine silica powder of the present invention, when the ink acceptor layer coated on the surface of the printing paper is formed with the material like water, such as the slurry of the alcoholic solution etc., said surface-modified fine silica powder can be dispersed uniformly into this material, so that the excellent ink acceptor layer can be formed. When the silica is hydrophobic, the dispersibility to such a material like water is low, so that the preferable ink acceptor layer cannot be formed.

Moreover, by mixing the surface-modified fine silica powder with alcohol to become the silica slurry, the forming liquid of the ink acceptor layer can be obtained. It is suitable that the silica concentration of this liquid is 3 to 30%. When the surface-modified fine silica powder is less than 3%, the additive effect is a little, and when the surface-modified fine silica powder is more than 30%, the viscosity of the slurry becomes high. Therefore, they are not suitable for coating the solution uniformly. By coating this ink acceptor layer on the surface of the printing paper, such as the recording paper etc., the printing material suitable for ink-jets can be obtained.

EXAMPLE

Hereinafter, the examples of the present invention are explained with the comparison examples. In addition, in these examples, the adsorption amount and hydrophilic of the anion source compound are measured with the following processes. The results of these examples 1 to 6 and the comparison examples 1 to 8 are shown in Table 1.

Measuring the Adsorption Amount

Sodium p-toluenesulfonate aqueous solution (2.5 mmol/L) is put into a beaker, and added 2 g of fine silica powders to disperse in this aqueous solution with stirring. After stirring for 5 minutes, this liquid is filtrated by a syringe having the filter, where a pore size is 0.45 μm, and this filtrate is taken out the glass sample bottle to be extracted 1 ml correctly with a measuring pipet, and this extracted liquid is put into the volumetric flask to be diluted with pure water to 100 ml. Next, the transparency of the predetermined wavelength (220.8 nm) light to the sample was measured using the spectrophotometer made by NIPPON BUNKO Co. (V-570). At this time, the quartz cell with capacity of 10 mm adjusted to 100% with pure water was prepared, and pure water is put into a reference side and the above-mentioned diluted solution is put into a sample side. The measured value was calculated to obtain the adsorption amount by using the following formula (a). Then, the value of percentage of said calculated adsorption amount is determined as the sample adsorption amount. In addition, the adsorption amount of sodium benzenesulfonate can be calculated like above process. When the adsorption amounts of sodium benzoate and sodium 2-naphthalenesulfonate are measured instead of sodium p-toluenesulfonate, about sodium benzoate, the transparency is measured with the light of the wavelength of 224.0 nm, and the adsorption amount is calculated with the following formula (b). About sodium 2-naphthalenesulfonate, transparency is measured with the light of the wavelength of 274.8 nm, and the adsorption amount is calculated with the following formula (c). In addition, in the following formulas, Y is the concentration (mmol/L) of sodium p-toluenesulfonate in the extracted sample liquid, X is transparency (%), and Z is the adsorption amount (mmol/L) to the silica.

| (a) | $Y = -4.32 \ln(X) + 19.76$, | $Z = 2.5 - Y$ |
| (b) | $Y = -5.42 \ln(X) + 24.86$, | $Z = 2.5 - Y$ |
| (c) | $Y = -9.06 \ln(X) + 41.76$ | $Z = 10 - Y$ |

Hydrophilic Evaluation

The hydrophilic is evacuated with the state, where the surface-modified fine silica powder is dispersed in water. Concretely, about 2 g of the surface-modified fine silica powder is put into the beaker having capacity of 300 ml, and 100 ml of pure water is added to stir for one minute with the magnetic stirrer. Then, the fine silica powder, which floats on water, is determined as the hydrophilic powder.

Measuring the Nitrogen Content

The sample is oxidized at high temperature, and the generated NOx reacts with ozone to become the excited state. By measuring the light with the all nitrogen analysis equipment made by Mitsubishi Kagaku Co. (Trade name is TN-10) at the time of dropping the ground state from the excited state, the nitrogen content is determined.

Example 1

100 g of the silica powder synthesized by the vapor phase method and having the specific surface area of 200 m$^2$/g by the BET method, in which its tradename was Aerosil1200, was put into the mixer. While stirring under nitrogen atmosphere, 20 mmol/100 g of N-β-(aminoethyl)-γ-aminopropyltrimethoxy silane dissolved in the same weight of methanol, in which said silane was made by the SHINETSU KAGAKU Co. and its tradename was KBM603, was dropped onto the silica powder. Then, the mixed powder was heated at 200° C. for one hour with stirring. After removing a volatile component, said mixed powder was cooled to be obtained the surface-modified fine silica powder. The adsorption amount of sodium p-toluenesulfonate to this fine silica powder was 22%. In addition, the adsorption amount before the surface-treatment was 12%, and therefore, the adsorption amount after the surface-treatment was 183% of that before the surface-treatment. Moreover, this surface-modified silica powder was hydrophilic, and the nitrogen content was 0.50%.

Example 2

100 g of the silica powder synthesized by the vapor phase method and having the specific surface area of 380 m$^2$/g by the BET method, in which its tradename was Aerosil1380S, was put into the mixer. While stirring under nitrogen atmosphere, 53 mmol/100 g of γ-aminopropyltrimethoxy silane dissolved in the same weight of methanol, in which said silane was made by the SHINETSU KAGAKU Co. and its tradename was KBE903, was dropped onto the silica powder. Then, the mixed powder was heated at 200° C. for one hour with stirring. After removing the volatile component, said mixed powder was cooled to be obtained the surface-modified fine silica powder. The adsorption amount of sodium benzoate to this fine silica powder was 29%. In addition, the adsorption amount before the surface-treatment was 15%, and therefore, the adsorption amount after the surface-treatment was 193% of that before the surface-treatment. Moreover, this surface-modified silica powder was hydrophilic, and the nitrogen content was 0.56%.

Example 3

100 g of the silica powder synthesized by the vapor phase method and having the specific surface area of 380 m$^2$/g by the BET method, in which its tradename was Aerosil 380S, was put into the mixer. While stirring under nitrogen atmosphere, 20 mmol/100 g of γ-aminopropyltrimethoxy silane and 30 mmol/100 g of γ-(2-aminoethyl) aminopropyltrimethoxy silane, which were dissolved in the same weights of methanol, were dropped simultaneously, in which the former silane was made by the SHINETSU KAGAKU Co. and its tradename was KBE903, and the later silane was made by Dow Corning Toray Silicone Co. and its tradename was SH6020. Then, the mixed powder was heated at 200° C. for one hour with stirring. After removing the volatile component, said mixed powder was cooled to be obtained the surface-modified fine silica powder. The adsorption amount of sodium 2-naphthalenesulfonate to this fine silica powder was 14%. In addition, the adsorption amount before the surface-treatment was 8%, and therefore, the adsorption amount after the surface-treatment was 175% of that before the surface-treatment. Moreover, this surface-modified silica powder was hydrophilic.

Comparison Example 1

100 g of the silica powder synthesized by the vapor phase method and having the specific surface area of 300 m$^2$/g by the BET method, in which its tradename was Aerosil 1300, was put into the silica powder. While stirring under nitrogen atmosphere, 8 mmol/100 g of γ-aminopropyltrimethoxy silane dissolved in the same weight of methanol, in which said silane was made by the SHINETSU KAGAKU Co. and its tradename was KBM903, was dropped onto the silica powder. Then, the mixed powder was heated at 200° C. for one hour with stirring. After removing the volatile component, said mixed powder was cooled to be obtained the surface-modified fine silica powder. This surface-modified silica powder was hydrophilic. However, the adsorption amount of sodium p-toluenesulfonate to this fine silica powder was 15%, In addition, the adsorption amount before the surface-treatment was 8%, and therefore, the adsorption amount after the surface-treatment was 125% of that before the surface-treatment. Moreover, the nitrogen content was 0.10%.

Comparison Example 2

100 g of the silica powder synthesized by the vapor phase method and having the specific surface area of 380 m$^2$/g by the BET method, in which its tradename was Aerosil 380S, was put into the mixer. While stirring under nitrogen atmosphere, 8 mmol/100 g of γ-aminopropyltrimethoxy silane dissolved in the same weight of methanol, in which said silane was made by the SHINETSU KAGAKU Co. and its tradename was KBE903, was dropped onto the silica powder. Then, the mixed powder was heated at 200° C. for one hour with stirring. After removing the volatile component, said mixed powder was cooled to be obtained the surface-modified fine silica powder. This surface-modified silica powder was hydrophilic. However, the adsorption amount of sodium benzoate to this fine silica powder was 19%, In addition, the adsorption amount before the surface-treatment was 15%, and therefore, the adsorption amount after the surface-treatment was 127% of that before the surface-treatment. Moreover, the nitrogen content was 0.09%.

Comparison Example 3

100 g of the silica powder synthesized by the vapor phase method and having the specific surface area of 300 m$^2$/g by the BET method, in which its tradename was Aerosil 1300, was put into the mixer. While stirring under nitrogen atmosphere, 4 mmol/100 g of γ-aminopropyltrimethoxy silane and 4 mmol/100 g of γ-(2-aminoethyl) aminopropyltrimethoxy silane, which were dissolved in the same weight of methanol, were dropped simultaneously, in which the former silane was made by the SHINETSU KAGAKU Co. and its tradename was KBM903, and the later silane was made by Dow Corning Toray Silicone Co. and its tradename was SH6020. Then, the mixed powder was heated at 200° C. for one hour with stirring. After removing the volatile component, said mixed powder was cooled to be obtained the surface-modified fine silica powder. This surface-modified silica powder was hydrophilic. However, the adsorption amount of sodium 2-naphthalenesulfonate to this fine silica powder was 10%, In addition, the adsorption amount before the surface-treatment was 8%, and therefore, the adsorption amount after the surface-treatment was 125% of that before the surface-treatment. Moreover, the nitrogen content was 0.08%.

Example 4

100 g of the silica powder synthesized by the vapor phase method and having the specific surface area of 380 m$^2$/g by the BET method, in which its tradename was Aerosil 380S, was put into the mixer. While stirring under nitrogen atmosphere, 70 mmol/100 g of γ-(2-aminoethyl) aminopropyltrimethoxy silane dissolved in the same weight of methanol, in which said silane was made by Dow Corning Toray Silicone Co. and its tradename was SH6020, was dropped onto the silica powder. Then, the mixed powder was heated at 200° C. for one hour with stirring. After removing the volatile component, said mixed powder was cooled to be obtained the surface-modified fine silica powder. The adsorption amount of sodium benzenesulfonate to this fine silica powder was 58%. In addition, the adsorption amount before the surface-treatment was 19%, and therefore, the adsorption amount after the surface-treatment was 305% of that before the surface-treatment. Moreover, this surface-modified silica powder was hydrophilic, and the nitrogen content was 0.95%.

Example 5

The surface-modified fine silica powder was obtained like Example 4 excepting that 100 g of the silica powder synthesized by the vapor phase method and having the specific surface area of 200 m$^2$/g by the BET method, in which its tradename was Aerosil 200CF, and 32 mmol/100 g of γ-aminopropyltrimethoxy silane made by the SHINETSU KAGAKU Co, in which its tradename was KBE903, were used. The adsorption amount of sodium benzenesulfonate to this fine silica powder was 17%. In addition, the adsorption amount before the surface-treatment was 10%, and therefore, the adsorption amount after the surface-treatment was 170% of that before the surface-treatment. Moreover, this surface-modified silica powder was hydrophilic, and the nitrogen content was 0.32%.

Example 6

The surface-modified fine silica powder was obtained like Example 4 excepting that the silica powder synthesized by the vapor phase method and having the specific surface area of 300 m$^2$/g by the BET method, in which its tradename was Aerosil300 was used, and 20 mmol/100 g of γ-aminopropyltrimethoxy silane and 20 mmol/100 g of γ-(2-aminoethyl) aminopropyltrimethoxy silane, which were dissolved in the same weight of methanol, were dropped simultaneously, in which the former silane was made by the SHINETSU KAGAKU Co. and its tradename was KBM903, and the later silane was made by Dow Corning Toray Silicone Co. and its tradename was SH6020. The adsorption amount of sodium benzenesulfonate to this fine silica powder was 38%. In addition, the adsorption amount before the surface-treatment was 15%, and therefore, the adsorption amount after the surface-treatment was 253% of that before the surface-treatment. Moreover, this surface-modified silica powder was hydrophilic, and the nitrogen content was 0.68%.

Comparison Example 4

The surface-modified silica powder was obtained like Example 4 excepting that the dropping amount of γ-(2-aminoethyl) aminopropyltrimethoxy silane to 100 g of the silica powder, was 28 mmol/100 g, in which said silane was made by Dow Corning Toray Silicone Co. and its tradename was SH6020, and the silica powder was synthesized by the vapor phase method, had the specific surface area of 380 m$^2$/g by the BET method, and its tradename was Aerosil 380S. The adsorption amount of sodium benzenesulfonate to this fine silica powder was 13%. In addition, the adsorption amount before the surface-treatment was 19%, and therefore, the adsorption amount after the surface-treatment was 68% of that before the surface-treatment. Moreover, this surface-modified silica powder was hydrophilic, and the nitrogen content was 0.28%.

Comparison Example 5

The surface-modified silica powder was obtained like Example 5 excepting that the dropping amount of γ-aminopropyltriethoxy silane to 100 g of the silica powder, was 28 mmol/100 g, in which said silane was made by SHINETSU KAGAKU Co. and its tradename was KBE903, and the silica powder was synthesized by the vapor phase method, had the specific surface area of 200 m$^2$/g by the BET method and its tradename was Aerosil200CF. The adsorption amount of sodium benzenesulfonate to this fine silica powder was 11%. In addition, the adsorption amount before the surface-treatment was 10%, and therefore, the adsorption amount after the surface-treatment was 110% of that before the surface-treatment. Moreover, this surface-modified silica powder was hydrophilic, and the nitrogen content was 0.18%.

Comparison Example 6

The surface-modified silica powder was obtained like Example 6 excepting that the dropping amount of γ-aminopropyltrimethoxy silane and γ-(2-aminoethyl) aminopropyltrimethoxy silane to 100 g of the silica powder, were 12 mmol/100 g respectively, in which the former silane was made by SHINETSU KAGAKU Co and its tradename was KBE903, and the later silane was made by Dow Corning Toray Silicone Co and its tradename was SH6020, and the silica powder was synthesized by the vapor phase method, had the specific surface area of 300 m$^2$/g by the BET method, and its tradename was Aerosil 300. The adsorption amount of sodium benzenesulfonate to this fine silica powder was 12%. In addition, the adsorption amount before the surface-treatment was 15%, and therefore, the adsorption amount after the surface-treatment was 80% of that before the surface-treatment. Moreover, this surface-modified silica powder was hydrophilic, and the nitrogen content was 0.23%.

Comparison Example 7

The surface-modified silica powder was obtained like Example 5 excepting that the dropping amount of γ-aminopropyltrimethoxy silane to 100 g of the silica powder, was 30 mmol/100 g, and hexamethyldisilazane was 5 mmol/100 g, in which said silane was made by SHINETSU KAGAKU Co and its tradename was KBE903, and the silica powder was synthesized by the vapor phase method, had the specific surface area of 200 m$^2$/g by the BET method, and its tradename was Aerosil 200CF. This surface-modified silica powder was hydrophilic, and the adsorption amount of sodium benzenesulfonate to this fine silica powder could not be measured. The nitrogen content of this silica powder was 0.22 g.

Comparison Example 8

The surface-modified fine silica powder was obtained like Example 4 excepting that 100 g of the silica powder synthesized by the vapor phase method, having the specific surface area of 150 m$^2$/g by the BET method, was used, in which its tradename was Aerosil 150, and the dropping amount of γ-(2-aminoethyl) aminopropyltrimethoxy silane was 400 mmol/g, in which said silane was made by Dow Corning Toray Silicone Co. and its tradename was SH6020. The adsorption amount of sodium benzenesulfonate to this fine silica powder was 10%. In addition, the adsorption amount before the surface-treatment was 8%, and therefore, the adsorption amount after the surface-treatment was 125% of that before the surface-treatment. Moreover, this surface-modified silica powder was hydrophilic, and the nitrogen content was 0.12%.

Example 7

25 weight parts of the surface-modified fine silica powder prepared in Example 4 was dispersed in the solution by the wet jet mill to prepare the silica slurry, where the solution comprised 10 weight parts of polyvinyl alcohol made by Kuraray Co. and having the tradename as PVA220, 70 weight parts of water, and 5 weight parts of acetic acid. pH of this slurry solution was 4.5. Moreover, the viscosity was 1 to 15 mPa·s at 22° C. and the sharing speed of 0.15 to 100/sec. Water and polyvinyl alcohol were added to this silica slurry solution until that the silica concentration became 13% and polyvinyl alcohol concentration became 10%, and said mixed solution was dispersed by the homogenizer to make the forming liquid of the ink acceptor layer. This forming liquid was coated on a non coated ink-jet paper by the bar coater method to make the layer thickness of 8 μm after drying, in which the non coated paper was made by Mitsubishi Paper Mills Ltd. and its tradename was IJ-L.

When this paper was printed by using the color ink-jet printer made by Canon Co. and having the tradename as BJF-600, there were no cracking of coating film and blotting with ink.

Comparison Example 9

The silica slurry solution was prepared like Example 7 excepting that 25 weight parts of the surface-modified fine silica powder prepared in Comparison Example 4 were used. pH of this solution was 3.9, and the viscosity was measured to be 40 to 160 mPa·s by the same process as Example 7. In addition, water and polyvinyl alcohol are added to this silica slurry solution until that the silica concentration was 13% and polyvinyl alcohol concentration was 10%, and said mixed solution was dispersed by the homogenizer to make the forming liquid of the ink acceptor layer. When the paper coated this forming liquid like Example 4 was printed like Example 7, there were no cracking of coating film, but some blotting with ink were observed.

Effectiveness on Industry

The surface-modified fine silica powder of the present invention has the excellent effect as the mixing material of the printing material. When said fine silica powder is mixed to use for the ink acceptor layer, there are no blotting with ink and cracking of coating film etc., and the excellent printing effect can be obtained. Specifically, in the printing by the ink-jet, there is no blotting with ink, and excellent clear nature and fixing of ink are obtained.

TABLE 1

| No. | Specific Surface Area of Silica | Surface-treatment Reagent Kinds | Amount | Anion Source Compound | Adsorption Amount of Treated Powder | Adsorption Amount of Untreated Original Powder | Ratio of Adsorption Amounts | Nitrogen Content % |
|---|---|---|---|---|---|---|---|---|
| Example 1 | 200 | N-β(aminoethyl)-γ-aminopropyltrimethoxy silane | 20 | Sodium p-toluenesulfonate | 22 | 12 | 183 | 0.50 |
| Example 2 | 380 | γ-aminopropyltrimethoxy silane | 53 | Sodium benzoate | 29 | 15 | 193 | 0.56 |
| Example 3 | 300 | γ-aminopropyltrimethoxy silane<br>γ-(2-aminoethyl)aminopropyltrimethoxy silane | 30<br>30 | Sodium 2-naphthalenesulfonate | 14 | 8 | 175 | 0.92 |
| Comparison Example 1 | 200 | γ-aminopropyltrimethoxy silane | 8 | Sodium p-toluenesulfonate | 15 | 12 | 125 | 0.10 |
| Comparison Example 2 | 380 | γ-aminopropyltriethoxy silane | 8 | Sodium benzoate | 19 | 15 | 127 | 0.09 |
| Comparison Example 3 | 300 | γ-aminopropyltrimethoxy silane<br>γ-(2-aminoethyl)aminopropyltrimethoxy silane | 4<br>4 | Sodium 2-naphthalenesulfonate | 10 | 8 | 125 | 0.08 |
| Example 4 | 380 | γ-(2-aminoethyl)aminopropyltrimethoxy silane | 70 | Sodium benzenesulfonate | 58 | 19 | 305 | 0.95 |
| Example 5 | 200 | γ-aminopropyltriethoxy silane | 32 | Sodium benzenesulfonate | 17 | 10 | 170 | 0.32 |
| Example 6 | 300 | γ-aminopropyltriethoxy silane<br>γ-(2-aminoethyl)aminopropyltrimethoxy silane | 20<br>20 | Sodium benzenesulfonate | 38 | 15 | 253 | 0.68 |
| Comparison Example 4 | 380 | γ-(2-aminoethyl)aminopropyltrimethoxy silane | 28 | Sodium benzenesulfonate | 13 | 19 | 68 | 0.28 |
| Comparison Example 5 | 200 | γ-aminopropyltriethoxy silane | 28 | Sodium benzenesulfonate | 11 | 10 | 110 | 0.18 |
| Comparison Example 6 | 300 | γ-aminopropyltriethoxy silane<br>γ-(2-aminoethyl)aminopropyltrimethoxy silane | 12<br>12 | Sodium benzenesulfonate | 12 | 15 | 80 | 0.23 |
| Comparison Example 7 | 200 | γ-aminopropyltriethoxy silane<br>hexamethyldisilazane | 30<br>5 | Sodium benzenesulfonate | — | 10 | — | 0.22 |
| Comparison Example 8 | 150 | γ-(2-aminoethyl)aminopropyltrimethoxy silane | 40 | Sodium benzenesulfonate | 10 | 8 | 125 | 0.12 |

(Note)
Specific Surface Area is the value by the BET method (m²/g). Amount of Surface-treatment Reagent is mmol/100 g. Adsorption Amounts of Treated Powder and Untreated Original Powder are %. Ratio of Adsorption Amounts is the ratio (%) of the adsorption amount after the surface-treatment to the adsorption amount of the original powder before the surface-treatment.

What is claimed is:

1. A surface-modified fine silica powder having an adsorbing ability for an anion source compound,
   wherein said powder is obtained by a surface-modified treatment process comprising more than 10 mmol of a treating agent containing an amino group is added under dry-process in nitrogen atmosphere to 100 g of the fine silica powder which is a fumed-silica obtained by a flame hydrolysis method, having the specific surface area of 50 to 400 m²/g by the BET method; and after holding the treating agent and the fine silica powder under heating to at least 200° C. and vigorous stirring, the obtained powder has been surface-modified, and wherein the nitrogen content of said surface-modified fine silica powder is 0.3 to 1.0%, and wherein the ratio of the absorbed anion source compound of the surface-modified fine silica powder to the unmodified fine silica powder is more than 150%.

2. The surface-modified fine silica powder according to claim 1, wherein the anion source compound is sodium benzenesulfonate and the adsorption amount of sodium benzenesulfonate is 15 to 60%, after the surface-treatment.

3. The surface-modified fine silica powder according to claim 1, wherein a treatment reagent containing amino group which is used in the surface-modified treatment process, comprises an organic silicon compound having a hydrolysis group or a silanol group combined with a silicon atom, and at least one amino group.

4. The surface-modified fine silica powder according to claim 3, wherein the surface treating is done by using one or more of the treatment reagent containing amino group is an organosilane shown in the general formula [1] of $(R1)_n \cdot (R2)SiY_{(3-n)}$, where R1 is a monovalence hydrocarbon group, R2 is a hydrocarbon group containing more than one amino group, Y is a hydrolysis group or a hydroxyl group, and n is 0, 1, or 2.

5. The surface-modified fine silica powder according to claim 1, wherein said fine silica powder is hydrophilic, and is used as the material of the ink acceptor layer of the printing material.

6. A low viscosity silica slurry comprising the surface-modified fine silica powder according to claim 1, wherein the specific surface area is 200 to 400 m²/g by the BET method, and the viscosity is 1 to 50 mPa·s under pH of 3 to 6 and the silica concentration is 15 to 30%.

7. A forming material of the ink acceptor layer containing 5 to 30% of the surface-modified fine silica powder according to claim 1.

8. An ink jet printing material coated with the liquid comprising the material of the ink acceptor layer according to claim 7.

9. The low viscosity silica slurry according to claim 6, wherein the surface-modified silica powder absorbs 15–60% of the anion source compound when the anion source compound is sodium benzenesulfonate; and is surface-treated with the treating agent containing an amino group, comprising an organic silicon compound having a hydrolysis group or a silanol group combined with a silicon atom and at least one amino group; and is hydrophilic and is used as the material of the ink acceptor layer of the printing material.

10. The surface modified fine silica powder having an adsorbing ability for an anion source compound as claimed in claim 1 wherein the anion source compound is a sulfonate or a carboxylate.

* * * * *